(12) United States Patent
Slusarczyk et al.

(10) Patent No.: US 11,686,367 B2
(45) Date of Patent: Jun. 27, 2023

(54) HYDRAULIC DAMPER AND A PISTON FOR THE HYDRAULIC DAMPER ASSEMBLY

(71) Applicant: BeijingWest Industries Co., Ltd., Beijing (CN)

(72) Inventors: Pawel Slusarczyk, Cracow (PL); Marcin Knapczyk, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 121 days.

(21) Appl. No.: 17/105,496

(22) Filed: Nov. 25, 2020

(65) Prior Publication Data
US 2021/0164534 A1   Jun. 3, 2021

Related U.S. Application Data

(60) Provisional application No. 62/942,055, filed on Nov. 29, 2019.

(30) Foreign Application Priority Data

Oct. 19, 2020 (CN) .......................... 202011116638.3

(51) Int. Cl.
  *F16F 9/512* (2006.01)
  *F16F 9/348* (2006.01)
(52) U.S. Cl.
  CPC .......... *F16F 9/5126* (2013.01); *F16F 9/3482* (2013.01); *F16F 9/3484* (2013.01)
(58) Field of Classification Search
  CPC ...... F16F 9/3481; F16F 9/3482; F16F 9/3484; F16F 9/5126
  See application file for complete search history.

(56) References Cited

U.S. PATENT DOCUMENTS

| 5,148,897 A | 9/1992 | Vanroye |
| 9,067,471 B2 | 6/2015 | Tuts et al. |

(Continued)

FOREIGN PATENT DOCUMENTS

| CN | 202023876 U | 11/2011 |
| CN | 105723115 A | 6/2016 |

(Continued)

OTHER PUBLICATIONS

Extended European Search Report dated May 6, 2021 for counterpart European patent application No. 20209768.9.

(Continued)

*Primary Examiner* — Melody M Burch
(74) *Attorney, Agent, or Firm* — William H. Honaker; Dickinson Wright PLLC

(57) ABSTRACT

A hydraulic damper assembly comprises a housing defining a fluid chamber. A piston is slidably disposed in the fluid chamber dividing the fluid chamber into a compression and a rebound chamber. A piston rod couples to the piston for movement between a compression and a rebound stroke. The piston has a compression surface and a rebound surface. The piston defines at least one compression channel, at least one rebound channel, and at least one additional channel. A compression valve covers the at least one compression channel. A rebound valve covers the at least one rebound channel. A proportional bleeding system located between the compression valve and the piston to establish a bleeding flow passage between the at least one rebound chamber and the at least one additional channel for reducing operation harshness of the hydraulic damper assembly. A piston for the hydraulic damper assembly is also disclosed herein.

16 Claims, 5 Drawing Sheets

(56) References Cited

U.S. PATENT DOCUMENTS

| | | | |
|---|---|---|---|
| 2006/0283676 A1* | 12/2006 | Deferme | F16F 9/3485 |
| | | | 188/322.15 |
| 2008/0314704 A1 | 12/2008 | Deferme | |
| 2009/0057079 A1* | 3/2009 | Vanbrabant | F16F 9/3488 |
| | | | 188/313 |
| 2013/0333993 A1 | 12/2013 | Yu | |
| 2014/0262655 A1* | 9/2014 | Tuts | F16F 9/512 |
| | | | 188/322.15 |

FOREIGN PATENT DOCUMENTS

| | | | | |
|---|---|---|---|---|
| DE | 102018220654 A1 * | 6/2020 | | |
| EP | 0632212 A2 | 1/1995 | | |
| EP | 1158202 A2 | 11/2001 | | |
| JP | 53132673 A | 11/1978 | | |
| JP | 6110135 A | 1/1986 | | |
| WO | WO-2009149331 A2 * | 12/2009 | | B60G 13/08 |

OTHER PUBLICATIONS

First Office Action and search report dated Jan. 5, 2022 for counterpart Chinese patent application No. 202011116638.3, along with machine EN translation downloaded from EPO.

\* cited by examiner

HYDRAULIC DAMPER AND A PISTON FOR THE HYDRAULIC DAMPER ASSEMBLY

CROSS-REFERENCE TO RELATED APPLICATION

The present application claims the benefits of U.S. Provisional Application Ser. No. 62/942,055, filed on Nov. 29, 2019, and Chinese Patent Application No. 202011116638.3, filed on Oct. 19, 2020, the entire content of which are incorporated herein by reference in their entireties.

BACKGROUND OF THE INVENTION

1. Field of the Invention

The present invention relates generally to a hydraulic damper assembly and a piston for the hydraulic damper assembly.

2. Description of the Prior Art

Hydraulic suspension dampers typically comprise a tube filled with working liquid, inside of which a slidable piston assembly is placed. The piston assembly is attached to a piston rod led outside the damper through the piston rod guide, and comprises a piston with rebound and compression valve assemblies, which control the flow of working liquid passing through the piston assembly during the rebound and the compression stroke of the damper. Some dampers comprise also a base (bottom) valve assembly with separate rebound and compression valve assemblies controlling the flow of working liquid passing in and out of the compensation chamber, usually formed between the inner and the outer tube of the damper.

Each valve assembly usually comprises a stack of resilient disks, often with an additional compression spring, covering the flow passages of the piston and acting as one way valve, deflecting or moving under the pressure of the working liquid to allow the medium flow. Number, shape, diameter, and thickness of each disk provide, among others, an adjustable compression and rebound damping forces.

Typical damper characteristic of damping force vs. piston velocity is a trade-off between improvement of the car handling properties and reduction of the unwanted car vibrations (a so called NVH—Noise, Vibration, Harshness requirements). Although dampers featuring low compression forces with degressive characteristics are required to improve the passengers comfort, during severe road and/or drive conditions they also often lead to maximally admissible wheel-knuckle displacements in damper compression direction leading to a suspension closure or jounce bumper engagement, which in turn affects the car safety, comfort, durability, and noise issues.

One such a damper is disclosed in U.S. Pat. No. 9,067,471. The damper includes a housing extending along a center axis between an opened end and a closed end. The housing defines a fluid chamber extending therebetween for containing a working fluid. A piston is slidably disposed in the fluid chamber dividing the fluid chamber into a compression chamber and a rebound chamber. A piston rod extends along the center axis and couples to the piston for moving the piston between a compression stroke and a rebound stroke. The piston has a compression surface and a rebound surface. The piston defines at least one compression channel, and at least one rebound channel for allowing the working fluid to flow through the piston during the compression stroke and the rebound stroke. The at least one compression channel radially spaced from an exterior surface of the piston and extending from the compression surface to the rebound surface. The at least one rebound channel, radially and circumferentially spaced from the at least one compression channel, extends from the exterior surface toward the compression surface.

There exists a need of independent tuning of damper force characteristic for primary and secondary rides. It is difficult to fulfill such a requirement for existing passive valve systems because standard valve components have influence as on low as high velocity damper characteristic

SUMMARY OF THE INVENTION

The present invention in its broadest aspect provides for a hydraulic damper assembly having an improved damper characteristics for low and medium velocity ranges. The present invention also reduces damper harshness, e,g, transition between low speed and medium speeded damping, improves the ride comfort and balance of a vehicle. In addition, the present invention provides a hydraulic damper assembly having improved tunability.

It is one aspect of the present invention to provide a hydraulic damper assembly. The hydraulic damper assembly comprises a housing extending along a center axis between an opened end and a closed end. The housing defines a fluid chamber extending therebetween for containing a working fluid. A piston is slidably disposed in the fluid chamber dividing the fluid chamber into a compression chamber and a rebound chamber. A piston rod extends along the center axis and couples to the piston for moving the piston between a compression stroke and a rebound stroke. The piston has a compression surface and a rebound surface. The piston defines at least one compression channel, at least one rebound channel, and at least one additional channel, for allowing the working fluid to flow through the piston during the compression stroke and the rebound stroke. The at least one compression channel radially spaced from an exterior surface of the piston and extending from the compression surface to the rebound surface. The at least one rebound channel, radially and circumferentially spaced from the at least one compression channel, extends from the exterior surface toward the compression surface at an oblique angle relative to the center axis. The at least one additional channel, located between the center axis and the at least one compression channel, extends along the piston toward the compression surface. A compression valve is located on the rebound surface of the piston covering the at least one compression channel for limiting working fluid flow through the piston during the compression stroke. A rebound valve is located in the compression chamber and covering the at least one rebound channel for limiting working fluid flow through the piston during the rebound stroke to provide a damping force during the rebound stroke. A proportional bleeding system is located between the compression valve and the piston to establish a bleeding flow passage between the at least one rebound chamber and the additional channel for reducing operation harshness of the hydraulic damper assembly.

It is another aspect of the present invention to provide a piston for a hydraulic damper assembly. The piston comprises a body extending along a center axis between a compression surface and a rebound surface. The body defines at least one compression channel, at least one rebound channel, and at least one additional channel, for allowing working fluid to flow through the body. The at least one compression channel is radially spaced from an exterior surface of the body and extends from the compression surface to the rebound surface. The at least one rebound channel is radially and circumferentially spaced from the at least one compression channel and extends from the exterior surface toward the compression surface at an oblique angle relative to the center axis. The at least one additional channel is located between the center axis and the at least one compression channel and extends along the body in a parallel relationship with the center axis toward the compression surface. A compression valve is located on the rebound surface of the body covering the at least one compression channel for limiting working fluid flow through the body during the compression stroke. A rebound valve is located in the compression chamber and covering the at least one rebound channel for limiting working fluid flow through the body during the rebound stroke to provide a damping force during the rebound stroke. A proportional bleeding system is located between the compression valve and the body to establish a bleeding flow passage between the at least one rebound chamber and the additional channel for reducing operation harshness of the hydraulic damper assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a hydraulic damper assembly 20 constructed in accordance with one embodiment of the present invention is generally shown in FIGS. 1-5.

Figure 1:
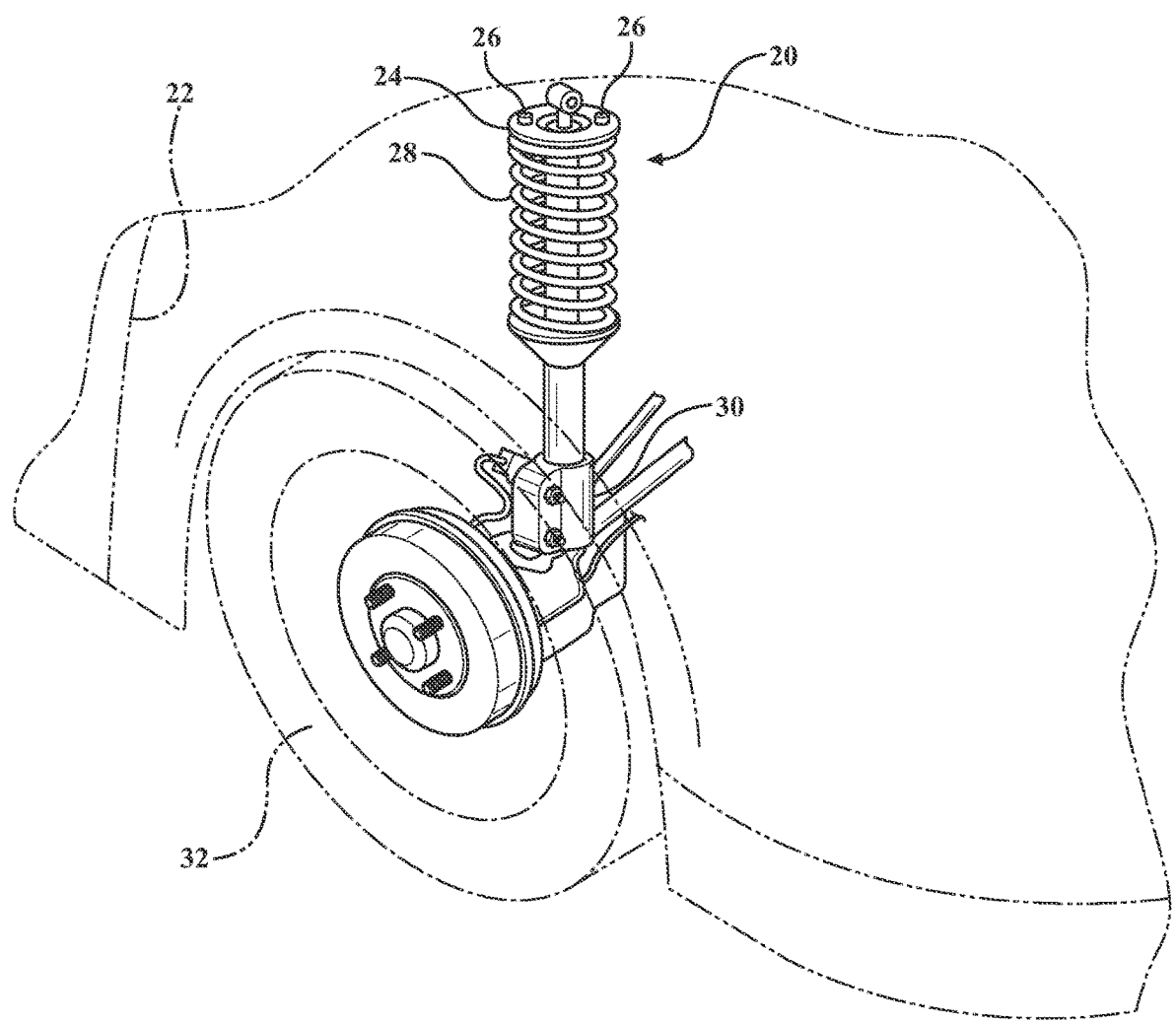
FIG. 1 is a fragmentary view of a vehicle suspension including a hydraulic damper assembly constructed in accordance with one embodiment of the present invention.

FIG. 1 schematically illustrates a fragment of an exemplary vehicle suspension including the hydraulic damper assembly 20 being attached to a vehicle chassis 22 via a top mount 24 and a number of fasteners 26 disposed on a periphery of an upper surface of the top mount 24. The top mount 24 connects to a coil spring 28. The hydraulic damper assembly 20 connects to the steering knuckle 30 supporting a vehicle wheel 32.

Figure 2:
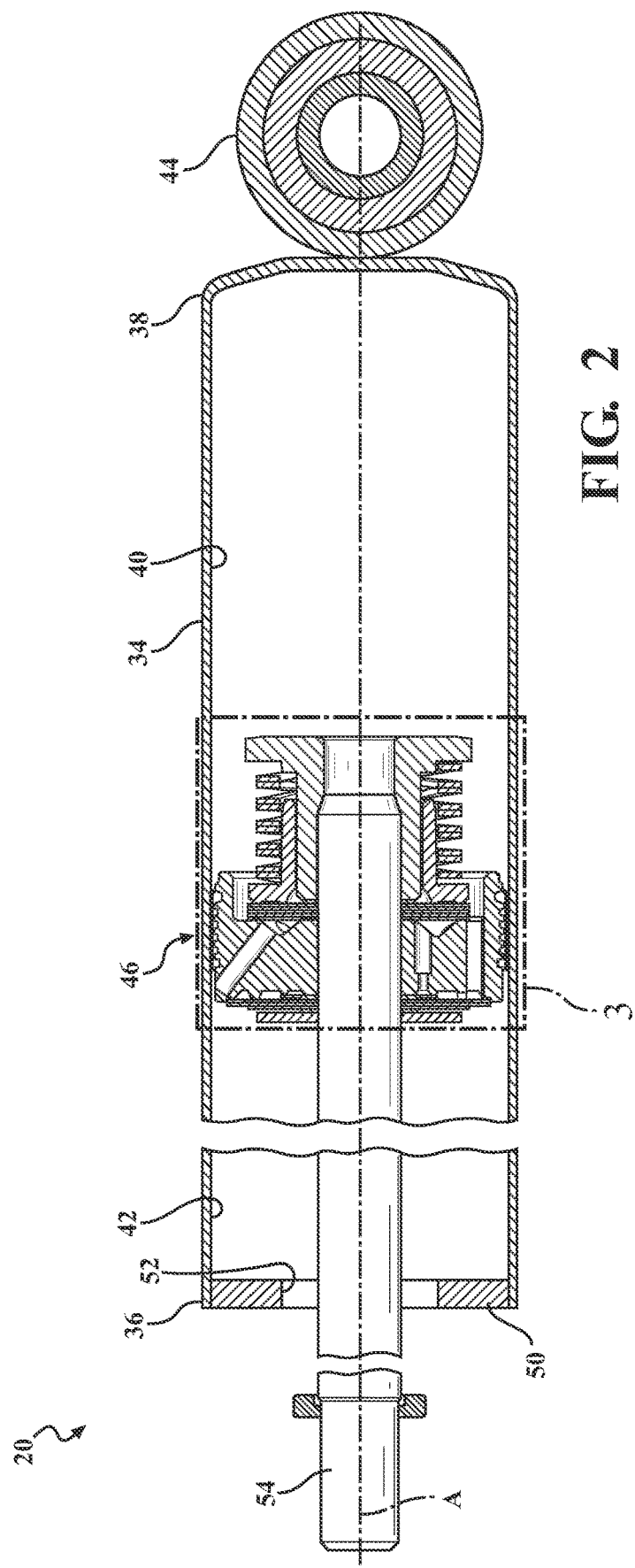
FIG. 2 is a cross-sectional perspective view of the hydraulic damper assembly.

As best shown in FIGS. 2, the hydraulic damper assembly 20 comprises a housing 34, having a generally cylindrical shape, disposed on a center axis A. The housing 34 extends between an opened end 36 and a closed end 38. The housing 34 defines a fluid chamber 40, 42 extending along the center axis A between the opened end 36 and the closed end 38 for containing a working fluid. A mounting ring 44, having a generally circular shape, attaches to the closed end 38 for securing the housing 34 to the vehicle.

A piston 46 including a body 48, having a generally cylindrical shape, is slidably disposed in the fluid chamber 40, 42 dividing the fluid chamber 40, 42 into a compression chamber 40 and a rebound chamber 42. The compression chamber 40 extends between the closed end 38 and the piston 46. The rebound chamber 42 extends between the opened end 36 and the piston 46. A piston rod guide 50 is located in the rebound chamber 42, adjacent to the opened end 36 of the housing 34 and in sealing engagement with the opened end 36 of the housing 34 to close the fluid chamber 40, 42. The piston rod guide 50 defines a bore 52, having a generally cylindrical shape, extending along the center axis A and in communication with the rebound chamber 42. A piston rod 54, having a generally cylindrical shape, extends along the center axis A, through the bore 52, and into the rebound chamber 42 to a distal end 56. The piston rod 54 couples to the piston 46 for moving the piston 46 in said fluid chamber 40, 42 between a compression stroke and a rebound stroke. During the compression stroke, the piston rod 54 and the piston 46 move towards the closed end 38 of the housing 34. During the rebound stroke, the piston rod 54 and the piston 46 moving toward the opened end 36 of the housing 34.

The piston rod 54 includes a projection 58 extending outwardly from the distal end 56 of the piston rod 54 and through the piston 46 to a terminal end 60, spaced apart from the piston 46, to couple the piston 46 to the piston rod 54. The body 48 of the piston 46 defines a hole 62, having a generally cylindrical shape, extending along the center axis A and receiving the projection 58 to allow the projection 58 to extend through the piston 46. A retaining member 64, located at the terminal end 60, couples to the projection 58 to secure the body 48 of the piston 46 to the piston rod 54.

Figure 3:
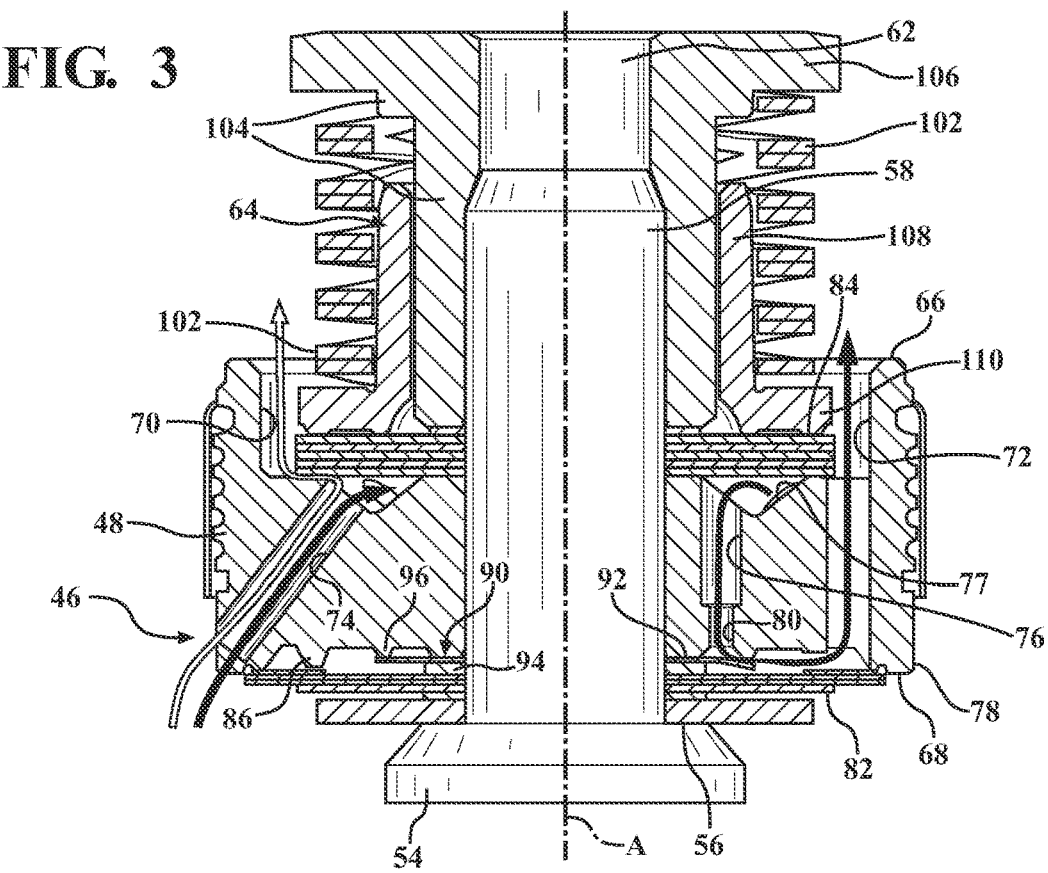
FIG. 3 is a cross-sectional perspective view of a piston for the hydraulic damper assembly according to one embodiment of the present invention.
Figure 4:
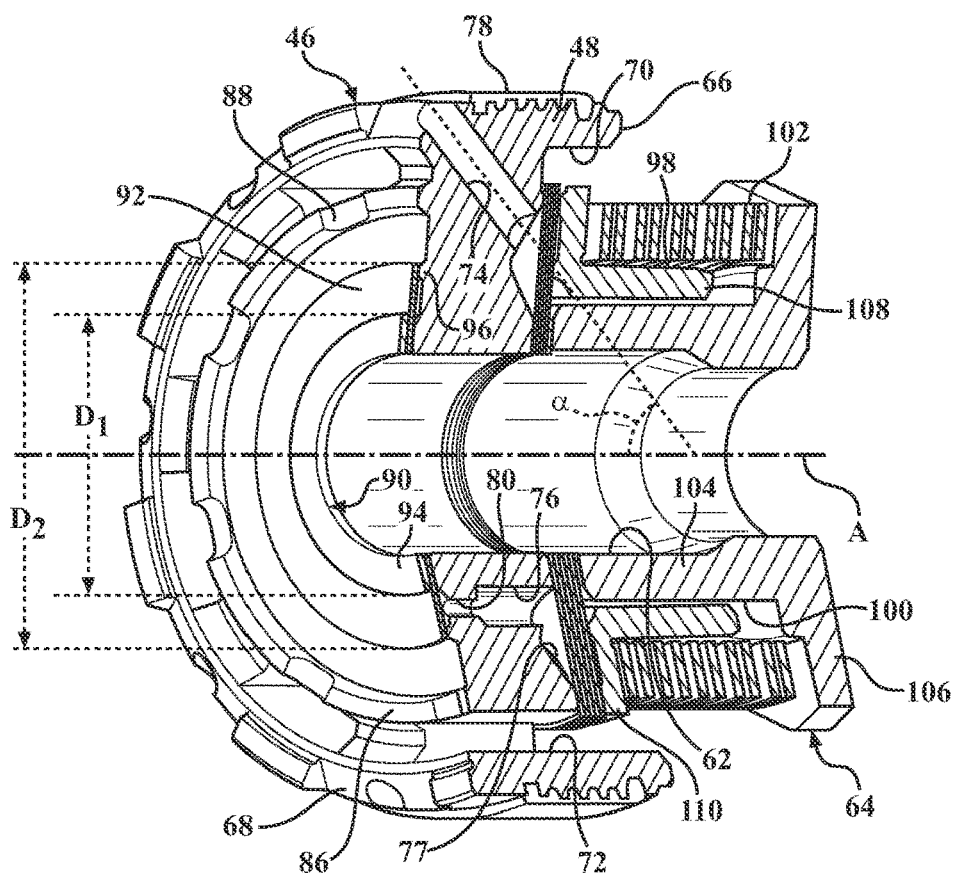
FIG. 4 is a sectional perspective view of the piston of the hydraulic damper assembly.

According to an embodiment of the present invention and as best shown in FIGS. 3-4, the body 48 of the piston 46 has a compression surface 66 and a rebound surface 68. The compression surface 66, located in the compression chamber 40, faces the closed end 38. The rebound surface 68, located in the rebound chamber 42, faces the opened end 36. The body 48 of the piston 46 defines a cavity 70 located on the compression surface 66 extending from the compression surface 66 toward the rebound surface 68.

The body 48 of the piston 46 defines a plurality of channels 72, 74, 76 for allowing the working fluid to flow through the piston 46 during the compression stroke and the rebound stroke. According to an embodiment of the present invention, the body 48 of the piston 46 defines at least one compression channel 72, at least one rebound channels 74, and at least one additional channel 76. The channels 72, 74, 76 extend through the piston 46 for allowing the working fluid to flow through the piston 46 during the compression stroke and the rebound stroke. The at least one compression channel 72, radially spaced from an exterior surface 78 of the body 48 of the piston 46, extends from the compression surface 66 to the rebound surface 68. The at least one rebound channel 74, radially and circumferentially spaced from the at least one compression channel 72, extends from the exterior surface 78 toward the compression surface 66 at an oblique angle relative to the center axis A. The at least one additional channel 76, located between the center axis A and the at least one compression channel 72, extends along the piston 46 toward the compression surface 66. The body 48 of the piston 46 defines a groove 77 in fluid communication with the cavity 70 and the at least one additional channel 76. The groove 77 extends about the center axis A and toward the rebound surface of the body 48 of the piston 46.

According to an embodiment of the present invention, the at least one compression channels 72 includes a plurality of compression channels 72. The plurality of compression channels 72 are located about the center axis A and circumferentially spaced from one another. The compression channels 72 extend from the compression surface 66 to the rebound surface 68 in a parallel relationship with the center axis A. The at least one rebound channels 74 includes a plurality of rebound channels 74. The plurality of rebound channels 74 are located about the center axis A, radially spaced from the compression channels 72 and circumferentially spaced from one another. Each rebound channel 74 of the set of rebound channels 74 is located on the exterior surface 78 and between adjacent compression channels 72 of the set of compression channels 72. The rebound channels 74 extend from the exterior surface 78 toward the compression surface 66 at an oblique angle α relative to the center axis A. According to an embodiment of the present invention, the oblique angle α is less than 90° relative to the center axis A. The at least one additional channel 76 includes a plurality of additional channels 76. The plurality of additional channels 76 are located between the center axis A and the compression channels 72 and about the center axis A. The additional channels 76 are circumferentially spaced from one another. In other words, the additional channels 76 are located closer to the center axis A than the compression channels 72 and the rebound channels 74. The additional channels 76 are in fluid communication with the cavity 70 and extend along the body 48 of the piston 46 in a parallel relationship with the center axis A toward the compression surface 66.

The rebound surface 68 of the piston 46 defines at least one orifice 80 in fluid communication with the at least one additional channel 76. According to an embodiment of the present invention, the at least one orifice 80 includes a plurality of orifices 80, located adjacent to the bore 52 and about the center axis A. The orifices 80 are circumferentially spaced from one another wherein each orifice 80 of the plurality of orifices 80 is in and in fluid communication with an additional channel 76 of the plurality of additional channels 76 for allowing the working fluid to flow through the body 48 of the piston 46. According to one embodiment of the present invention, each orifice 80 of the plurality of orifices 80 has a diameter less than a diameter of each additional channel 76 of the plurality of additional channels 76. It should be appreciate that the size of the diameter of the orifices 80 can be fined tune or calibrated depending on a user's preference.

Figure 5:
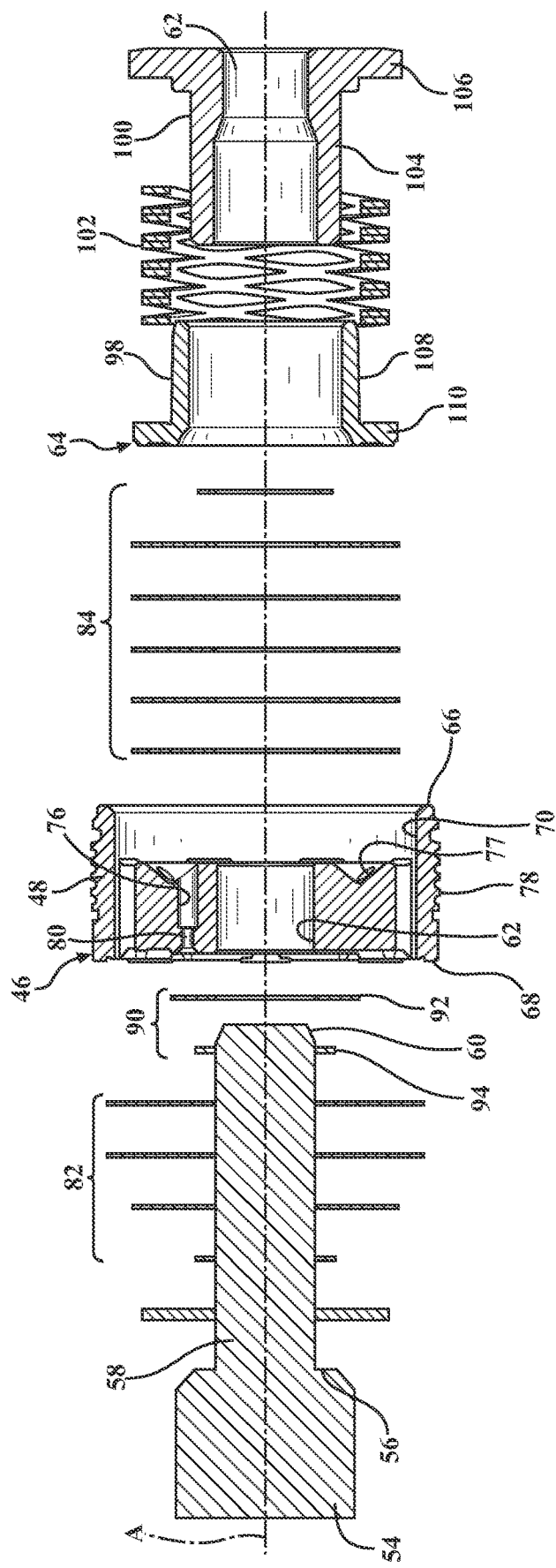
FIG. 5 is a cross-sectional exploded view of the piston of the hydraulic damper assembly.

As best illustrated in FIG. 5, a compression valve 82 including a plurality of discs with each disc having a generally circular shape, is located on the rebound surface 68 of the body 48 of the piston 46 covering the at least one compression channel 72 for limiting working fluid flow through the piston 46 during on compression stroke to provide a damping force during the compression stroke. According to an embodiment of the present invention, the compression valve 82 can include a plurality of five discs stacked on top of one another and sandwiched between the rebound surface and the distal end 56 of the piston rod 54. A rebound valve 84, including a plurality of discs with each disc having a generally circular shape, is located in the cavity 70 and sandwiched between the body 48 of the piston 46 and the retaining member 64 covering the at least one rebound channel 74 for limiting working fluid flow through the piston 46 during the rebound stroke to provide a damping force during the rebound stroke. According to an embodiment of the present invention, the rebound valve 84 can include a plurality of five discs stacked on top of one another and sandwiched between the piston 46 and the retaining member 64. It should be appreciated that each of the compression valve 82 and the rebound valve 84 can include up to ten discs.

A compression valve seat 86, located on the rebound surface 68 between the at least one compression channel 72 and the at least one additional channels 76, extends outwardly from the rebound surface 68 and annularly about the center axis A. The compression valve seat 86 is in an abutment relationship with the compression valve 82. As best illustrated in FIG. 4, the compression valve seat 86 defines at least one slot 88 in alignment with the at least one compression channel 72 and the at least one additional channel 76. According to an embodiment of the present invention, the at least one slot 88 can includes a plurality of slots 88. The plurality of slots 88 are located about the center axis A and circumferentially spaced from one another. Each slot 88 of the plurality of slots 88 is in an alignment with a compression channel 72 of the plurality of compression channels 72 to establish fluid communication between the at least one slot 88 and the at least one compression channel 72. According to an embodiment of the present invention, the slots 88 are located radially inwardly from the set of compression channels 72 wherein each slot 88 is in a radial alignment with each compression channel 72 of the plurality of compression channels 72.

A proportional bleeding system 90 is located between the compression valve 82 and the body 48 of the piston 46 to establish a bleeding flow passage between the at least one rebound channel 74 and the at least one additional channel 76 for reducing operation harshness of the hydraulic damper assembly 20. According to an embodiment of the present invention, the proportional bleeding system 90 includes an additional valve 92, 94, located between the compression valve 82 and the body 48 of the piston 46, covering the at least one additional channel 76 to provide a damping force to the working fluid flowing through the at least one additional channels 76.

According to an embodiment of the present invention, the additional valve 92, 94 of the proportional bleeding system 90 includes a deflective disc 92 and a spacer 94. The deflective disc 92, having a generally circular shape, is located adjacent to the piston 46 covering the set of additional channels 74. The spacer 94, having a generally circular shape, is located between the deflective disc 92 and the compression valve 82 to axially space the deflective disc 92 from the compression valve 82. According to an embodiment of the present invention, the spacer 94 has a diameter $D_1$ less than a diameter $D_2$ of the deflective disc 82 to allow the deflective disc 82 to flex in response to working fluid flowing through the additional channels 76. A protrusion 96, located between the compression valve seat 86 and the at least one additional channels 76, extending outwardly from the rebound surface 68 and annularly about the center axis A and in an abutment relationship with the deflective disc 92.

Referring back to FIG. 5, the retaining member 64 includes a top portion 98, a bottom portion 100, and a spring 102. The spring 102 is compressed between the top portion 98 and the bottom portion 100. The bottom portion 100 includes a bushing 104, having a generally cylindrical shape, extending about the center axis A and coupled to the projection 58 of the piston rod 54, thereby securing the retaining member 64 to the piston rod 54. A bottom flange 106 extends radially outwardly from the bottom portion 100 for receiving one end of the spring 102. The top portion 98 includes a sleeve 108, having a generally cylindrical shape, extending about the bushing 104. A top flange 110 extends radially outwardly from the top portion 98 for receiving another end of the spring 102. It should be appreciated that the present invention is applicable to various passive or controlled hydraulic dampers such as but not limited to mono-tube or twin-tube type hydraulic damper assemblies.

In operation, during a compression stroke, the piston rod 54 and the piston 46 move toward the closed end 38 of the housing 34. In response to the movement of the piston rod 54 and the piston 46, the working fluid contained in the compression chamber 40 becomes compressed and moves towards the rebound chamber 42 through the at least one compression channel 72 and the compression valve 82. Accordingly, the pressure of the compression valve 82 restricts the amount of working fluid flowing through the body 48 of the piston 46, thereby generating a damper force during the compression stroke.

As best illustrated in FIG. 3 wherein the arrows indicate the flow of the working fluid, during the rebound stroke, the piston rod 54 and the piston 46 move toward the opened end 36 of the housing 34. In response to the movement of the piston rod 54 and the piston 46, the working fluid contained in the rebound chamber 42 becomes compressed and moves toward the compression chamber 40 through the at least one rebound channel 74 and the rebound valve 84, as indicated by the hollow arrows. At the same time, the working fluid also flows toward the compression chamber 40 via the compression channels 72. In particular, as indicated by solid arrows, the working fluid flows through the at least one rebound channel 74 into the groove 77. Since the groove 77 is in fluid communication with the at least one additional channel 76, the working fluid flows through the at least one additional channel 76 and the at least one orifice 80 and into the at least one compression channel 72 via the proportional bleeding system 90. This arrangement causes the damping characteristic of the hydraulic damper assembly 20 to be more progressively for low speed thereby improving the handling of the vehicle. In other words, this arrangement provides smooth transition between states of closed and opened valves by reducing the effective gradient of the characteristic in transition area. It reduces the accelerations and jerks acting on the car body thereby improving the ride comfort of the vehicle.

Figure 6:
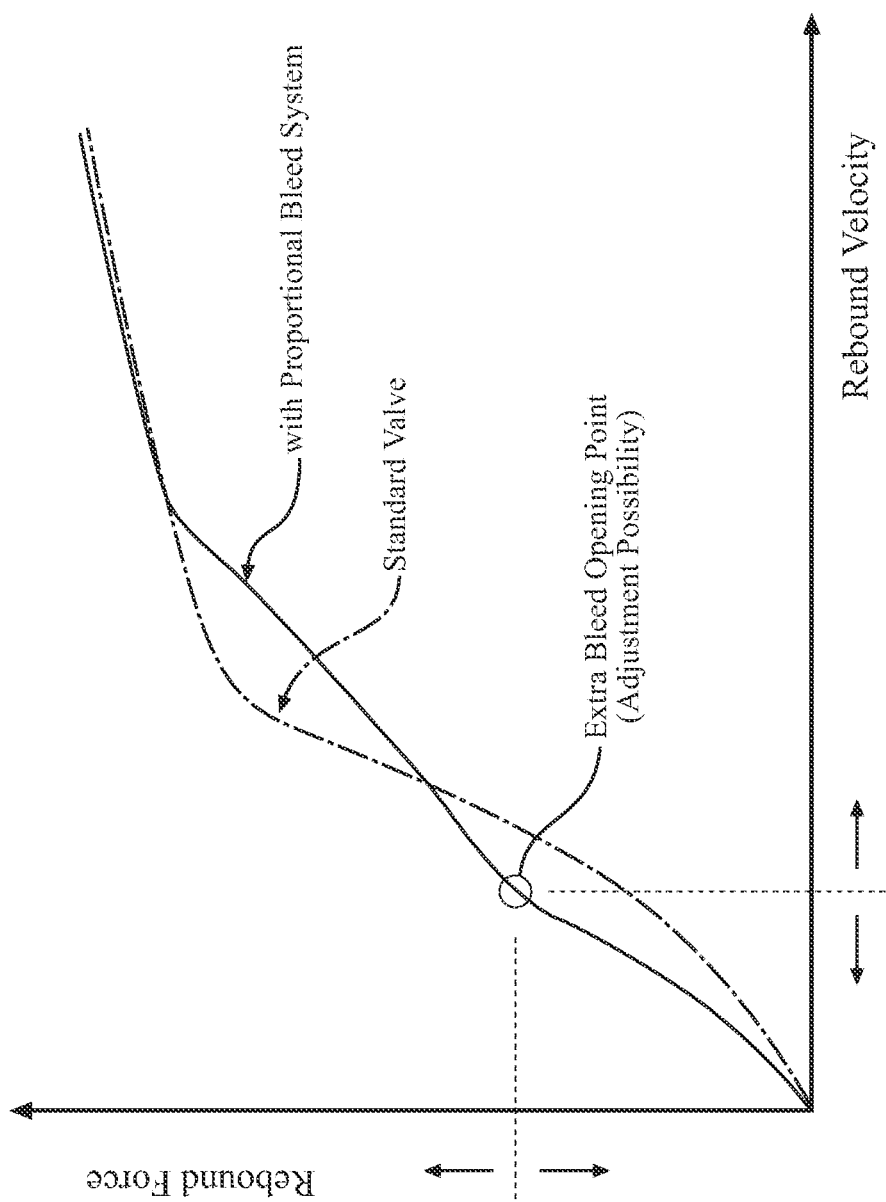
FIG. 6 is a graphical illustration of rebound force vs. rebound velocity for the hydraulic damper assembly including the piston according to an embodiment of the present invention.

FIG. 6 is a graphical illustration comparing the performance of a hydraulic damper assembly 20 constructed in accordance with the present invention and a standard hydraulic damper assembly. As illustrated in FIG. 6, the hydraulic damper assembly 20 constructed in accordance with the present invention shapes the rebound characteristic below the valve opening velocity. In addition, the hydraulic damper assembly 20 enables extra bleed opening point. It should be appreciated that the force for additional channels and the apertures can be adjust independently in wide velocity range. Accordingly, the damping characteristic of the hydraulic damper assembly can be more progressively set for low speed thereby improving the handling of the vehicle handling. Above the extra bleed opening point, e.g. indication of the opening of the deflective disc, the slope of the damping characteristic is much lower thereby providing a smoother transition between a closed state and an opened state of the deflective disc. In addition, this arrangement reduces the accelerations and jerks acting on the vehicle body which simultaneously improves the comfort.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper assembly, comprising:
a housing extending along a center axis between an opened end and a closed end, said housing defining a fluid chamber extending therebetween for containing a working fluid;
a piston slidably disposed in said fluid chamber dividing said fluid chamber into a compression chamber and a rebound chamber;
a piston rod extending along said center axis and coupled to said piston for moving said piston between a compression stroke and a rebound stroke;
said piston having a compression surface and a rebound surface, said piston defining at least one compression channel, at least one rebound channel, and at least one additional channel, for allowing the working fluid to flow through said piston during said compression stroke and said rebound stroke;
said at least one compression channel radially spaced from an exterior surface of said piston and extending from said compression surface to said rebound surface;
said at least one rebound channel, radially and circumferentially spaced from said at least one compression channel, extending from said exterior surface toward said compression surface at an oblique angle relative to said center axis;
said at least one additional channel, located between said center axis and said at least one compression channel extending along said piston toward said compression surface;
a compression valve located on said rebound surface of said piston covering said at least one compression channel for limiting working fluid flow through said piston during said compression stroke;
a rebound valve located in said compression chamber and covering said at least one rebound channel for limiting working fluid flow through said piston during said rebound stroke to provide a damping force during said rebound stroke;
a proportional bleeding system located between said compression valve and said piston to establish a bleeding flow passage between said at least one rebound chamber and said additional channel for reducing operation harshness of the hydraulic damper assembly; and
a compression valve seat extending outwardly from said rebound surface and in an abutment relationship with said compression valve;
wherein said compression valve seat defines at least one slot in an alignment with said at least one compression channel and said at least one additional channel to establish said bleeding flow passage;
wherein said rebound surface of said piston defines at least one orifice in communication with the at least one additional channel, so as to allow the working fluid to flow through said at least one additional channel and said at least one orifice and into said at least one compression channel via said proportional bleeding system.

2. The hydraulic damper assembly according to claim 1, wherein said at least one orifice has a diameter less than a diameter of said at least one additional channel.

3. The hydraulic damper assembly according to claim 1, wherein said proportional bleeding system includes an additional valve, located between said compression valve and said piston, covering said at least one additional channel.

4. The hydraulic damper assembly according to claim 3, wherein said additional valve includes a deflective disc and a spacer, each having a generally circular shape, said deflective disc being disposed adjacent to said piston covering said at least one additional channel and said spacer being disposed between said deflective disc and said compression valve to axially space said deflective disc from said compression valve.

5. The hydraulic damper assembly according to claim 4, wherein said spacer has a diameter less than a diameter of said deflective disc to allow said deflective disc to flex in response to working fluid flowing through said additional channel.

6. The hydraulic damper assembly according to claim 4, further including a protrusion, located between said compression valve seat and said at least one additional channel, extending outwardly from said rebound surface and annularly about said center axis parallel to said center axis and in an abutment relationship with said deflective disc.

7. The hydraulic damper assembly according to claim 1, further including a retaining member located in said compression chamber and coupled to said piston rod to secure said piston to said piston rod.

8. The hydraulic damper assembly according to claim 1, wherein said piston defines a groove in fluid communication with said at least one rebound channel, said at least one additional channel and said at least one orifice, said groove extending annularly about said center axis.

9. A piston for a hydraulic damper assembly, comprising:
a body extending along a center axis between a compression surface and a rebound surface, said body defining at least one compression channel, at least one rebound channel, and at least one additional channel, for allowing working fluid to flow through said body;
said at least one compression channel radially spaced from an exterior surface of said body and extending from said compression surface to said rebound surface;
said at least one rebound channel, radially and circumferentially spaced from said at least one compression channel, extending from said exterior surface toward said compression surface at an oblique angle relative to said center axis;
said at least one additional channel, located between said center axis and said at least one compression channel extending along said body toward said compression surface;
a compression valve located on said rebound surface of said body covering said at least one compression channel for limiting working fluid flow through said body during a compression stroke;
a rebound valve located in a compression chamber and covering said at least one rebound channel for limiting working fluid flow through said body during a rebound stroke to provide a damping force during said rebound stroke;
a proportional bleeding system located between said compression valve and said body to establish a bleeding flow passage between said at least one rebound chamber and said additional channel for reducing operation harshness of the hydraulic damper assembly; and
a compression valve seat extending outwardly from said rebound surface and in an abutment relationship with said compression valve;
wherein said compression valve seat defines at least one slot in an alignment with said at least one compression channel and said at least one additional channel to establish said bleeding flow passage;
wherein said rebound surface of said piston defines at least one orifice in communication with the at least one additional channel, so as to allow the working fluid to flow through said at least one additional channel and said at least one orifice and into said at least one compression channel via said proportional bleeding system.

10. The piston according to claim 9, wherein said at least one orifice has a diameter less than a diameter of said at least one additional channel.

11. The piston according to claim 9, wherein said proportional bleeding system includes an additional valve, located between said compression valve and said body, covering said at least one additional channel.

12. The piston according to claim 11, wherein said additional valve includes a deflective disc and a spacer, each having a generally circular shape, said deflective disc being disposed adjacent to said body covering said at least one additional channel and said spacer being disposed between said deflective disc and said compression valve to axially space said deflective disc from said compression valve.

13. The piston according to claim 12, wherein said spacer has a diameter less than a diameter of said deflective disc to allow said deflective disc to flex in response to working fluid flowing through said additional channel.

14. The piston according to claim 12, further including a protrusion, located between said compression valve seat and said at least one additional channel, extending outwardly from said rebound surface and annularly about said center axis parallel to said center axis and in an abutment relationship with said deflective disc.

15. The piston according to claim 9, further including a retaining member located adjacent to said compression surface of said body for coupling said body to a piston rod.

16. The piston according to claim 9, wherein the piston defines a groove in fluid communication with said at least one rebound channel, said at least one additional channel and said at least one orifice, said groove extending annularly about said center axis.

* * * * *